United States Patent
Jensen et al.

(10) Patent No.: US 12,541,835 B2
(45) Date of Patent: Feb. 3, 2026

(54) HARVESTING MACHINE MONITORING

(71) Applicant: AGCO International GmbH, Neuhausen (CH)

(72) Inventors: Jens Christian Skov Jensen, Randers (DK); Jeanette Pedersen, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/922,164

(22) Filed: Oct. 21, 2024

(65) Prior Publication Data

US 2025/0139752 A1 May 1, 2025

(30) Foreign Application Priority Data

Oct. 30, 2023 (GB) ...................................... 2316587

(51) Int. Cl.
| | |
|---|---|
| *H04N 7/18* | (2006.01) |
| *A01D 41/127* | (2006.01) |
| *G06T 7/00* | (2017.01) |
| *G06T 7/70* | (2017.01) |
| *G06V 10/20* | (2022.01) |
| *G06V 20/50* | (2022.01) |

(52) U.S. Cl.
CPC .......... *G06T 7/0002* (2013.01); *A01D 41/127* (2013.01); *G06T 7/70* (2017.01); *G06V 10/20* (2022.01); *G06V 20/50* (2022.01); *G06T 2200/24* (2013.01); *G06T 2207/30188* (2013.01); *G06T 2207/30242* (2013.01)

(58) Field of Classification Search
CPC ........... H04N 7/18; G06T 7/0002; G06T 7/70; G06T 2200/24; G06T 2207/30188; G06T 2207/30242; A01D 41/127; G06V 10/20; G06V 20/50

USPC ......................................................... 348/148
See application file for complete search history.

(56) References Cited

U.S. PATENT DOCUMENTS

| | | | | |
|---|---|---|---|---|
| 10,438,343 | B2 * | 10/2019 | Baurer .................... | G06T 7/001 |
| 10,803,617 | B2 * | 10/2020 | Khan ...................... | G06V 10/82 |
| 11,373,300 | B2 * | 6/2022 | Nakano ................. | G06T 3/4038 |
| 11,968,927 | B2 * | 4/2024 | Faust ...................... | G05D 1/667 |
| 12,178,158 | B2 * | 12/2024 | Vandike ............... | G05D 1/0274 |

(Continued)

FOREIGN PATENT DOCUMENTS

WO 2019129333 A1 7/2019

OTHER PUBLICATIONS

UK Intellectual Property Office, Search Report for related UK Application No. GB2316587.1, dated May 2, 2024, 3 pages.

*Primary Examiner* — Trang U Tran (57) ABSTRACT

Systems and methods are provided for monitoring operation of an agricultural harvesting machine. Image data is obtained and used to identify one or more material components within the image data in each of a plurality of image orientations. For each image orientation and for at least one of the one or more identified material components, one or more material characteristics are determined and used to select a primary image orientation from the plurality of image orientations. A material quality measure may then be determined for identified material component(s) in the primary image orientation and operation of one or more operable components of or otherwise associated with the harvesting machine can be controlled accordingly.

16 Claims, 5 Drawing Sheets

(56) References Cited

U.S. PATENT DOCUMENTS

| | | |
|---|---|---|
| 2015/0124054 A1 | 5/2015 | Darr et al. |
| 2017/0042081 A1* | 2/2017 | Zumbach ................. G01N 1/08 |
| 2019/0311198 A1 | 10/2019 | Zemenchik |
| 2022/0061216 A1 | 3/2022 | Heitmann et al. |
| 2023/0230202 A1* | 7/2023 | Eichhorn ................. G06T 5/77 |
| | | 345/629 |

* cited by examiner

FIG 4D

HARVESTING MACHINE MONITORING

CROSS-REFERENCE TO RELATED APPLICATIONS

This application claims the benefit of the filing date of U.K. Provisional Patent Application 2316587.1, "Harvesting Machine Monitoring," filed Oct. 30, 2023, the entire disclosure of which is incorporated herein by reference.

FIELD

Embodiments of the present disclosure relate generally to systems and methods for monitoring operation of an agricultural harvesting machine, and in particular a combine harvester or the like, for example, in dependence on an analysis of straw, residue or other material other than grain ("MOG") dispersed by the machine, in use.

BACKGROUND

Agricultural combines work to cut crop material from a field before separating the grain from the material other than grain (MOG), e.g. residue or straw material, on board. Generally, the grain is transferred to a grain bin of the combine (where it may be temporarily stored) and the MOG is deposited back onto the field. A second operation may be performed to gather (e.g. bale) the deposited MOG, where the MOG material comprises straw material, or the MOG may be used as a fertilizer for the soil in the field.

Given the importance of the dispersed MOG to future farming operations or tasks, it is important to enable an operator to monitor the quality of this material in some manner in case of necessary adjustments to be made to harvesting machine on the go, or for future planning for an area where the residue material is used as a fertilizer.

It would be advantageous to improve upon known systems such that the composition or quality of material dispersed from an agricultural harvesting machine, in use, can be adequately monitored.

BRIEF SUMMARY

In an aspect of the invention there is provided a system for monitoring operation of an agricultural harvesting machine, the system comprising: an imaging device configured for capturing image data; and one or more controllers, configured to: receive the image data from the imaging device; analyze the image data, in each of a plurality of image orientations, to identify one or more material components within the image data; determine, in each image orientation and for at least one of the one or more identified material components, one or more material characteristics; select a primary image orientation from the plurality of image orientations in dependence on the determined material characteristic(s); determine, in dependence on the material characteristic(s) for one or more of the identified material component(s) in the primary image orientation, a material quality measure indicative of a length of identified material component(s) in the primary image orientation; and generate and output one or more control signals for controlling operation of one or more operable components of or otherwise associated with the harvesting machine in dependence on the material quality measure.

Advantageously, the aspect described herein provides a means for utilizing an imaging device and appropriate processing thereof to determine a material quality measure based on a length measure of material components within image data. Specifically utilizing multiple image orientations may identify a primary orientation, e.g. one corresponding to a direction in which most visible material components are lying (e.g. those on top of a pile of crop material being analyzed). This may select material components for the determination of the quality measure which are visible to the imaging sensor in substantially their entirety. This may provide a more reliable measure of the length of those components compared with material components lower in the pile which may be more likely to be obscured from the imaging device by other material components, hence preventing their true length being determinable from the sensor data. In turn, this may provide a reliable material quality measure for providing feedback to an operator, e.g. of the agricultural harvesting machine, of the quality of an agricultural operation performed by the machine. A quality may be quantifiable in relation to the determined length with respect to a desired or target length of cut, for example.

The one or more controllers may collectively comprise an input (e.g. an electronic input) for receiving one or more input signals. The one or more input signals may comprise the image data. The one or more controllers may collectively comprise one or more processors (e.g. electronic processors) operable to execute computer readable instructions for controlling operational of the system, for example, to identify the material component(s), to determine the one or more material characteristics, to select the primary orientation; and/or to determine the material quality measure. The one or more processors may be operable to generate one or more control signals for controlling operation of the one or more operational components. The one or more controllers may collectively comprise an output (e.g. an electronic output) for outputting the one or more control signals.

The one or more controllers are configured to analyze the one or more material components at one or more image orientations. This may include determining an average length, e.g. pixelwise, of identified crop material components at the one or more image orientations. The one or more controllers may be configured to determine a count of identified material components at each orientation, for example a count of the number of identified material components having a length which exceeds a threshold length.

The one or more image orientations may comprise discrete directions or orientations within the image data or may be computed over a series of orientation ranges. For example, a selected image orientation for analysis may comprise a set image orientation or may comprise analysis across a predetermined range either side of the selected image orientation, e.g. plus or minus 5, or 10 degrees either side of the selected orientation. This may advantageously account for small bends in the material components or arcuate material components.

The one or more controllers are configured to select a primary orientation for determination of the material quality measure in dependence on the one or more material characteristics. The primary orientation may be selected in dependence on the image orientation at which the highest average length for identified material component(s) is determined. The primary orientation may be selected in dependence on the image orientation at which the largest number of material components are identified.

This may advantageously improve upon classical line detection methods, particularly in the case of straw of other crop material which, when dispersed by an agricultural harvester, may be overlapping in multiple direction in a somewhat chaotic manner. Selecting by orientation in the manner discussed herein may make is easier to filter for material components lying on an upper surface or "on top" of the crop material being imaged, thereby providing a better analysis of the dimensional measures and/or, in an extension, to a color or hue components of the image data.

The imaging device may preferably comprise a camera. The imaging sensor may be mounted or otherwise coupled to the agricultural harvesting machine, such as on a rear of the agricultural harvesting machine. In other embodiments, the imaging device may be provided by a user device, such as a portable or mobile user device carried by an operator of the agricultural harvesting machine. The portable user device may comprise a smartphone or tablet computer, for example, providing an imaging device in the form of a camera.

In such embodiments, the one or more controllers may be provided as one or more processors of the user device, e.g. running appropriate software thereon for performing the operational steps of the controller(s) as discussed herein. The system may alternatively be provided as a distributed system, with one or more controllers being provided on either the user device, on-board the agricultural machine, or remotely, e.g. on a remote or cloud based server as is desired. It may be possible to host the processing capabilities of the system on the user device, however, for more data intensive processes this may be more easily handled on a remote orc loud based server. The disclosure is not, however, limited in this sense as will be appreciated by the skilled reader.

The user device may comprise a user interface, providing an input means for the system for receiving a user input. The user input may include the control of a capture of one or more images, utilizing the imaging device of the user device. The one or more images may provide the image data for the system. Advantageously, the system may provide a portable device for capturing and analyzing images taken by an operator for assessing material quality.

The one or more controllers may be configured to analyze the image data, e.g. through performance of an object recognition process, to identify the one or more material components within the image data. This may include an image recognition process. The object or image recognition process may comprise a learned process, e.g. a machine learned process, trained with training data for identifying specific material component types from the image data. The object recognition process may provide information relating to the identified material components, which may include constituents of those components. This can include classifying whether the material component is grain, material other than grain ("MOG"), unthreshed crop material, etc.

The identification of the one or more material components may include the performance by the one or more controllers of one or more pre-processing steps on raw image data received from the imaging sensor. Image data which has been processed in accordance with the one or more pre-processing steps is referred to herein as "processed image data".

The one or more pre-processing steps may include an edge detection method for identifying the one or more material components within the image data. Advantageously, the edge detection process may readily identify boundaries between pixels corresponding to material components and those corresponding to background. The identified edges may be fed into the object recognition process, for example.

The one or more pre-processing steps may include a filtering process. For example, the one or more controllers may be configured to filter the image data. The filtering may advantageously remove background or noise from the image data, e.g. due to non-material components within the image (soil, dirt, etc.), non-desired components in the image (grasses, weeds etc.). The one or more controllers may be configured to apply a filter utilizing one or more image properties. The one or more image properties may relate to a brightness and/or hue pixel value, for example. The hue value for a given pixel may be utilized to distinguish between different components within the image, with the components to be identified and analyzed having an expected hue profile or range. Filtering by brightness may advantageously filter out those components which are not on or at an uppermost surface of the imaged material, with those at a lower level, for example, having a lower brightness value relative to those towards the top of the material. The controller(s) may therefore advantageously be configured to extract image data relating only to material components on an upper surface (or "on top") of the material pile—i.e. those which are more readily able to be analyzed for material characteristics thereof.

The one or more pre-processing steps may include a hole filling process. This may include a backfilling of "gaps" or "holes" in the processed image data with, for example, pixel values corresponding to an expected pixel value for material components. This may be performed for pixels or pixel groups which are smaller (in size) compared with a threshold size. A further consideration may be taken in relation to the location of the pixel or pixel group with other pixels within the image or pixel sets identified as a material component, e.g. based on their pixel hue value, brightness, etc. This may advantageously smooth the processed image data and account for noise in the raw image data.

The one or more pre-processing steps may include a smoothing process or noise correction. This may include application of an erosion or dilution process to the processed image data.

The one or more pre-processing steps may include a skeletonization process. This may advantageously provide a representation of the image data whereby identified material component(s) therein are all represented in a comparable manner—here having a consistent width (e.g. 1 pixel wide). In this way, a length for each identified material component can be more easily compared across the processed image data.

Following the pre-processing steps, the one or more controllers may be configured to identify the one or more material components through identification of one or more lines, e.g. substantially straight lines, in the image data corresponding to a pixel sequence across a portion of the image data. This may include application of a line detection algorithm on the processed image data to identify one or more material components represented as lines within the image data. This may include performance of a linear regression for identification of candidate material components.

The one or more controllers may be configured to identify a material component through comparison of the length of a candidate component with a threshold length. The threshold length may be predetermined, or be programmable by an operator, for example.

The one or more operable components of or otherwise associated with the harvesting machine may include a user interface, e.g. a display means, which may provide a representation, for example to an operator of the determined material quality measure. This may comprise providing an audible or visual indicator to the operator of the determined measure. For example, the user interface may be operable to or be instructed by the one or more controllers (e.g. through control signals output by the one or more controllers) to display or otherwise indicate the representation to the operator. The operator may utilize the representation to inform further adjustments or the like to be made to operation of the harvesting machine, for example, requests for which may also be input, via the user interface, by the operator. The user interface may comprise a display screen of the user device. The user interface may comprise a display terminal of the agricultural harvesting machine.

The one or more operable components may comprise a database, which may be stored locally, e.g. on a memory means associated with the one or more controllers. This may be provided as part of the processing system of a user device, for example, or as a memory means as part of a machine control system. The memory means may instead be provided as a remote memory, e.g. stored on a remote or cloud-based server. The one or more controllers may be configured to add data to, or update data stored within the databased in dependence on the determined material quality measure. This may comprise generation and/or updating a mapped representation of a working environment for the machine, mapping material quality across the environment as determined in the manner discussed herein. The stored data may be utilized for planning further operational tasks for the working environment, e.g. with knowledge of the material quality of residue material used for fertilization, or for planning of a baling operation where the material comprises straw material.

In further embodiments, the one or more operable components may include a control system for the harvesting machine itself, one or more components thereof, or a working implement operably coupled thereto, e.g. a header or components thereof. This may include control over one or more operating parameters of the machine or operable components, which may include a forward speed of the agricultural machine, an operating speed of an implement of the machine, such as a reel speed or the like of a header, an operating speed of a material processing assembly, such as a cleaning assembly of the machine, and/or operating parameters of a chopping assembly and/or spreader tool of the machine for chopping and spreading the material, as will be appreciated, which may include controlling an operating speed or operating frequency of the chopper tool or spreader. This may include an operational speed and/or operational settings to adjust a target cut length, for example.

The agricultural harvesting machine may comprise a harvester for cutting and optionally collecting and/or processing the cut crop material, such as a combine harvester, forage harvester, windrower or the like. The agricultural harvesting machine may include post-harvesting machinery, e.g. for gathering, moving and/or processing cut crop material, such as a baler, raking equipment, tedder equipment and the like.

A further aspect of the disclosure provides an agricultural harvesting machine comprising or controllable under operation of the system of any preceding aspect.

A further aspect provides a method for monitoring operation of an agricultural harvesting machine, the method comprising: receiving image data from an imaging device; analyzing the image data, in each of a plurality of image orientations, to identify one or more material components within the image data; determining, in each image orientation and for at least one of the one or more identified material components, one or more material characteristics; selecting a primary image orientation from the plurality of image orientations in dependence on the determined material characteristic(s); determining, in dependence on the material characteristic(s) for one or more of the identified material component(s) in the primary image orientation, a material quality measure indicative of a length of identified material component(s) in the primary image orientation; and controlling operation of one or more operable components of or otherwise associated with the harvesting machine in dependence on the material quality measure.

The method may comprise performing any one or more of the functionalities of the one or more controllers of the system described hereinabove.

A further aspect of the invention provides computer software comprising computer readable instructions which, when executed by one or more electronic processors, causes performance of a method in accordance with any aspect described herein.

A yet further aspect of the invention provides a computer readable medium having the computer software of the preceding aspect of the invention stored thereon.

Within the scope of this application it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

The present disclosure relates to systems 100, 200 for monitoring operation of an agricultural harvesting machine, here in the form of a combine harvester 10. The systems include an imaging device, here in the form of a camera 30, 230 for capturing image data, specifically of crop material processed by the combine harvester 10 and dispersed on the ground behind the machine, during use. Such an operation for the formation of residue and other material such as straw and its spreading on the ground behind the machine is well understood in the art. The system incorporates one or more controllers, configured to receive the image data from the cameras 30, 230, analyze the data, in each of a plurality of image orientations, to identify one or more material components within the image data and determine, for at least one of the one or more identified material components, one or more material characteristics. This is used to determine a material quality measure for the imaged material relating to a dimensional measure, here relating to a length for the identified components. Operation of one or more operable components of or otherwise associated with the harvester 10 can subsequently be controlled in dependence on the material quality measure, again as discussed herein.

Harvester

Figure 1:
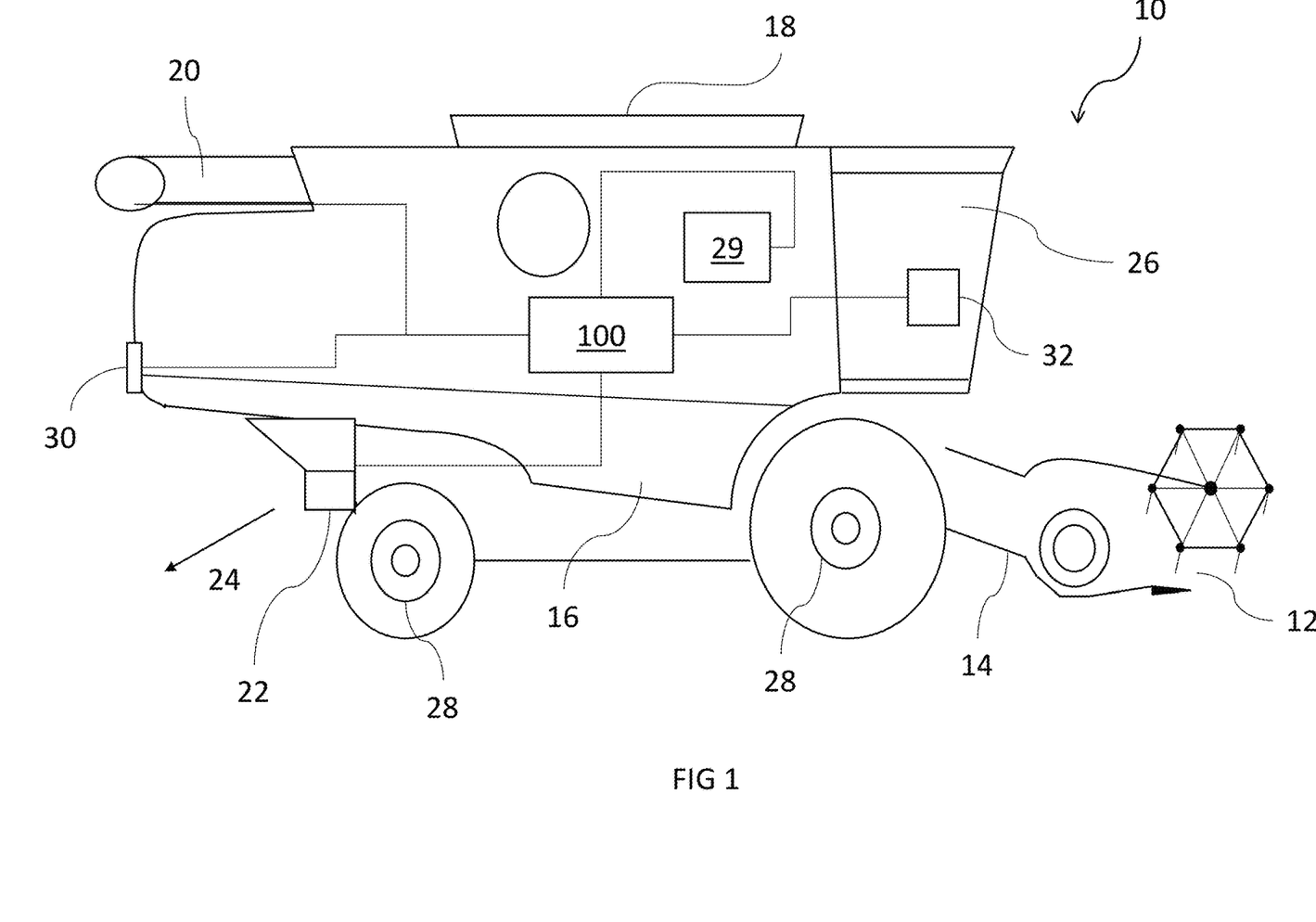
FIG. 1 is a simplified cross-sectional side view illustrating an agricultural harvesting machine embodying aspects of the present disclosure.

With reference to FIG. 1, an agricultural harvesting machine, and specifically a combine harvester 10, is shown embodying aspects of the present invention. The harvester 10 is coupled to a header 12 which is operable, in use, to cut and gather a strip of crop material as the harvester 10 is driven across a field/area to be harvested during a harvesting operation. A conveyor section 14 conveys the cut crop material from the header 12 into a crop processing apparatus 16 operable to separate grain and non-grain (i.e. material other than grain (MOG) or residue material (used interchangeably herein)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilizing unloading auger 20. Non-grain material, referred to interchangeably as "residue material" or "MOG", is here transferred to a chopper assembly, operable to cut the residue material. The cut non-grain material (MOG)/residue material is then moved to a spreader tool 22 which is operable in use to eject the cut non-grain material or MOG from the rear of the harvester 10 and onto the ground. In FIG. 1, this is represented by arrow 24 which illustrates the MOG being ejected rearwards from the harvester 10. The harvester 10 also typically includes, amongst other features, an operator cab 26, wheels 28, engine (not shown) and a user interface 32.

The harvester 10 additionally includes an imaging sensor 30 here in the form of a camera 30 which is mounted to the rear of the harvester 10, and having a field of view orientated substantially downwards to provide a field of view which encompasses a region behind the harvester 10. The camera 30 is used, by a system 100, to identify material components within the image—i.e. those corresponding to material, e.g. MOG, straw or other residue spread by the spreader tool 24 of the harvester 10 onto the ground behind the machine. Image data from the camera 30 is processed to ultimately determine a material quality measure for the material in the manner discussed herein.

Integrated System

Figure 2:
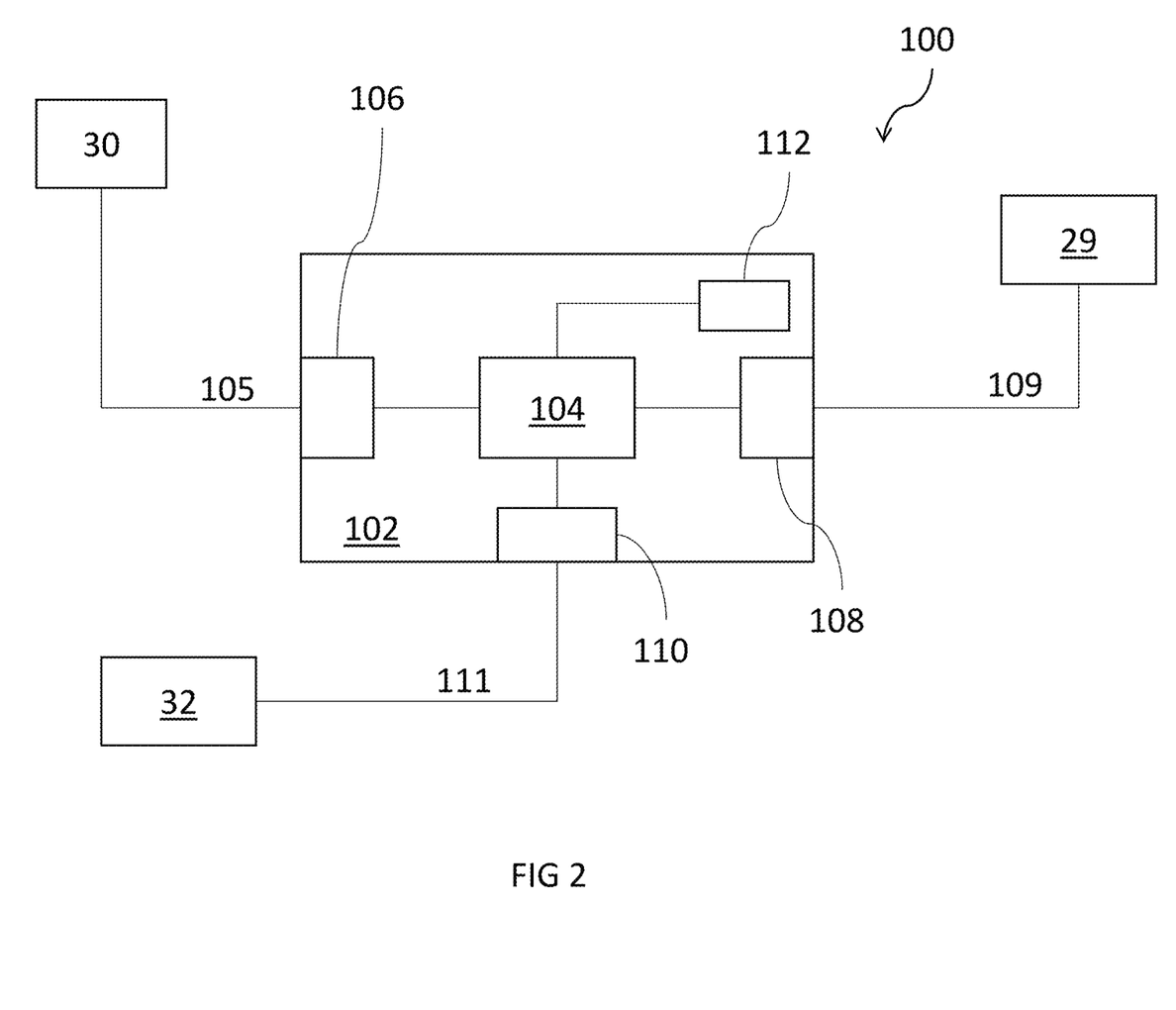
FIG. 2 is a schematic illustration of an embodiment of a system according to the present disclosure.

FIG. 2 illustrates a first embodiment of a system 100 according to the present disclosure.

As shown, the system 100 comprises a controller 102 having an electronic processor 104, an electronic input 106 and electronic outputs 108, 110. The processor 104 is operable to access a memory 112 of the controller 102 and execute instructions stored therein to perform the steps and functionality of the present invention discussed herein, e.g. by controlling a user interface 32, for example to provide an image to an operator of the harvester 10 illustrative of a representation of image data obtained by the camera 30, and/or a representation of a determined quality measure, determined in the manner discussed herein.

The processor 104 is operable to receive sensor data via input 106 which, in the illustrated embodiment, takes the form of input signals 105 received from the camera 30. Image data received from the camera 30 is analyzed by the processor 104 to firstly identify one or more material components within the image data. As discussed in detail herein, the processor 104 is operable to identify the one or more material components through application of suitable object recognition processes on the image data, which may include one or more of application of a machine learned object recognition algorithm, one or more pre-processing steps on raw image data received from the camera which may include an edge detection method, a filtering process, a hole filling process, a smoothing process or noise correction, and/or a skeletonization process.

Once identified in the image, the processor 104 extracts or determines a first material quality measure for the material based on one or more characteristics of the identified material component(s)—described in detail below. In the illustrated embodiments discussed herein, the one or more characteristics include a measure of a length of identified material components within the image data. The material quality measure is then determined by the processor 104 as an average material component length.

Output 108 of the controller 102 is operatively coupled to a memory means, here in the form of a server 29 remote from the controller 102 operable to store information therein relating to the operation of the system 100 and specifically information relating to the determined material quality metric. The processor generates and outputs, via output 108, control signals 109 for generating and/or updating data within the database stored at server 29. This can include a mapped representation of a working environment of the harvester 10 and associated material quality measures within that environment as determined by the processor 104.

Output 110 is operably coupled to the user interface 32, here in the form of a display terminal of the harvester 10. The processor 104 is operable to generate and output control signals 111 via output 110 to the user interface 32 for displaying thereon a graphical representation of image data from the camera 30 and/or a graphical representation of the determined quality measure. This may also include a representation of the mapped representation stored at server 29. An operator may utilize the displayed representation to inform adjustments to be made to a current harvesting operation, for future operational planning or the like.

In an extension of the system 100 and harvester 10 embodying the control system 100, the processor 104 may be configured to generate and output one or more control signals for controlling one or more further operating parameters of the harvester 10 or one or more systems thereof. For example, this may include controlling a forward speed of the harvester 10 or controlling an operating speed/parameter of one or more sub-systems of the harvester 10, including the header 12, conveyors 14, crop processing/cleaning apparatus, chopper tool, spreader tool 22 in dependence on the determined measure. In this way, the harvester 10 operation may be at least partly automated in dependence on the quality measure, e.g. to adjust a level of processing, or target cut length, applied to the crop material to change (e.g. improve) the material quality for the straw or other residue material analyzed by the system 100 of the present disclosure.

Distributed System

Figure 3:
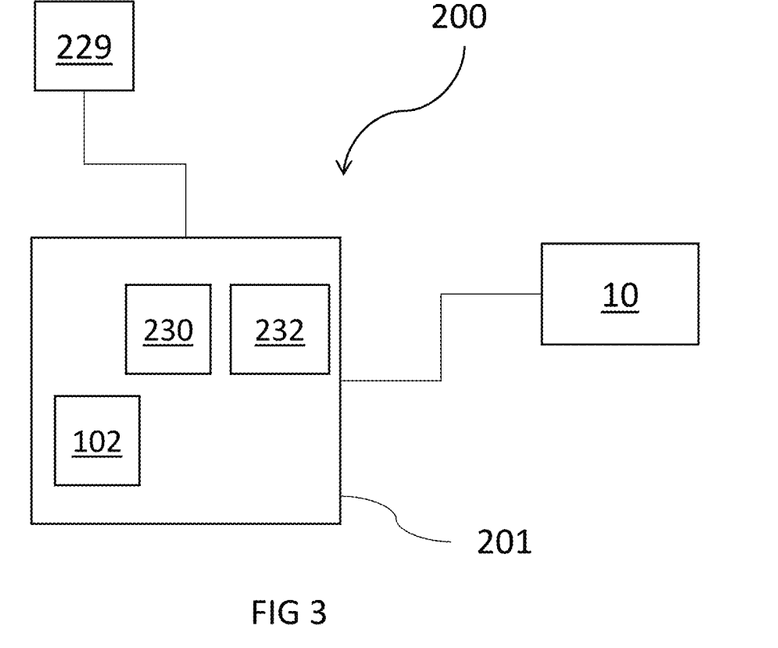
FIG. 3 is a further schematic illustration of a second embodiment of the present disclosure.

FIG. 3 illustrates a second embodiment of a system 200 in accordance with the present disclosure. Whilst the processing steps and capabilities of the components remain the same in this embodiment as in the system 100 shown in FIG. 2 and discussed above, system 200 is instead provided as a distributed system—that being part of the system 200 being provided separate from the machine 10.

Here, the controller 102 and hence processing capabilities thereof is provided by a user device 201, e.g. a smartphone or tablet computer carried by an operator of the harvester 10 for instance. The user device 201 additionally provides the imaging sensor in the form of an integrated camera 230 and a user interface in the form of display screen 232. The camera 230 is configured in the same manner as camera 30 discussed herein and used by an operator to obtain image data of material distributed by a spreader tool 22 of the harvester 10. Similarly, display screen 232 is configured in the same manner as user interface/display terminal 32 discussed above. The controller 102 is configured again in the same manner as controller 102 of system 100 and is operable to compute the material quality measure in the same manner discussed herein.

The mobile device 201 is communicable with both a remote and cloud-based server 229, which performs the same function as the server 29 discussed hereinabove. Furthermore, the mobile device 201 may also be communicable with the harvester 10 for optionally controlling operation thereof in some manner. Whilst not shown, a communication module of the mobile device 201 may be utilized for communicating offboard with the server 229 and/or the harvester 10, e.g. over a wireless communication network such as a cellular network or internet connection.

This arrangement is particularly beneficial as it is machine agnostic and simply requires the operator to carry the mobile device 201 with them in order to determine a quality metric for material processed by any machine. This can even be done later, e.g. when assessing whether previously cut material is at a desired quality for baling for example.

Operational Use—Identifying Individual Material Components

The remaining Figures illustrate an operational use of aspects of the invention. In particular, FIGS. 4A-5 illustrate how individual material components are identified and analyzed to determine the quality measure.

Figure 4A:
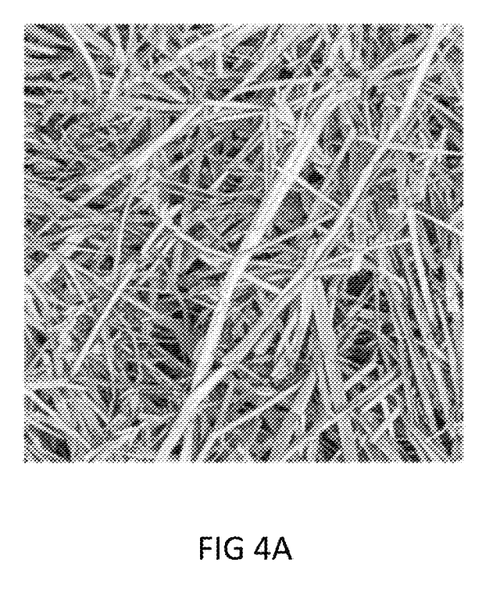
FIGS. 4A-4E are a series of sets of image data illustrating the operational use of aspects of the present disclosure.
Figure 4B:
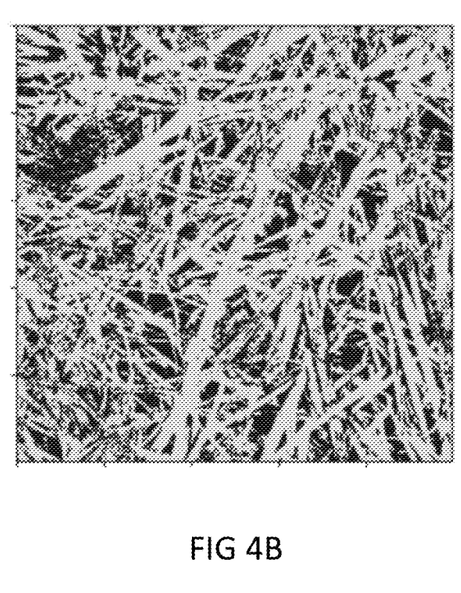
Figure 4C:
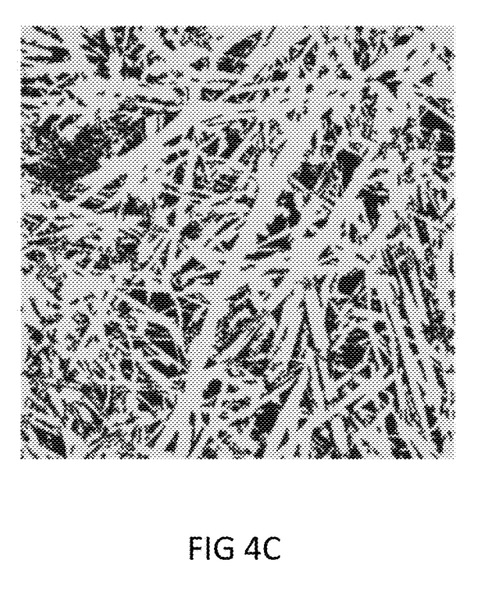
Figure 4D:
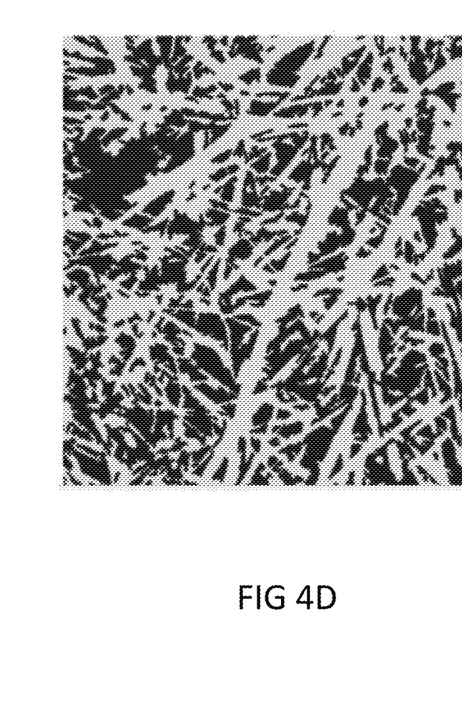
Figure 5:
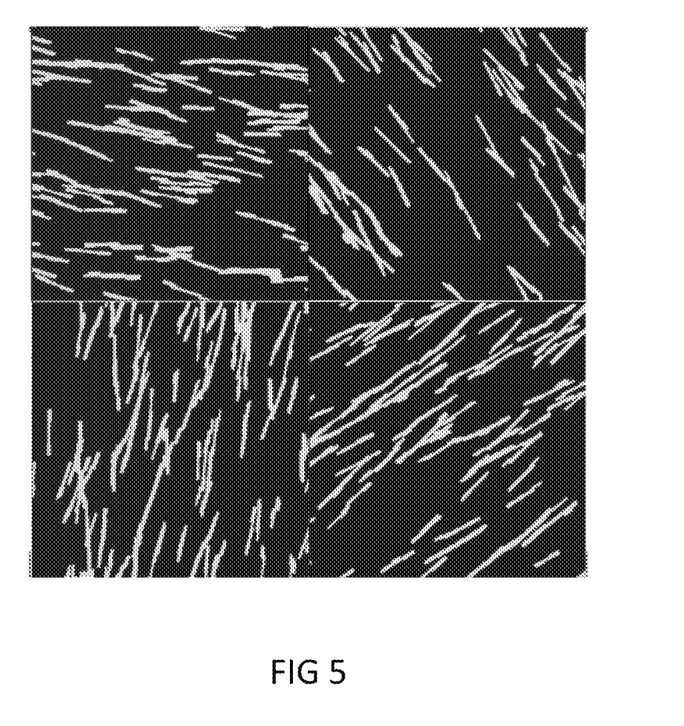
FIG. 5 is a further illustration of image data illustration the operational use of aspects of the present disclosure.

FIG. 4A illustrates a representation of raw image data obtained by the camera 30, 230 for analysis by the processor 104. For identifying individual material components, the processor is configured to perform a series of pre-processing steps on the raw image data received from the camera 30, 230. In the illustrated embodiment, the processor 104 is configured to first apply primary and secondary filtering steps to the raw image data.

Firstly, a primary filtering step is performed with the aim of removing non-desired material components from the image data. This is done through application of a filter using one or more image properties, and in particular a hue pixel value. Specifically, an expected hue pixel value for the components to be identified 0 e.g. straw—is utilized to define a threshold or range of hue pixel values expected in the image at the location of straw components. This may advantageously exclude material components which are not desired, dirt, soil, etc. whose pixel hue values lie outside of the selected range or above or below the defined threshold as desired. This is shown figuratively in FIG. 4B, where a hue pixel value filter has been applied to the raw image data of FIG. 4A.

A secondary filtering step is performed with the aim of removing background components, or looking at it the other way, to retain pixel data corresponding to material components lying on the top of the imaged material, with those at a lower level within the material pile being filtered out of the data for further analysis. This is done through application of a brightness filter by thresholding, by excluding from the data pixels having a lower brightness value relative to a threshold. This may make use of the fact that those pixels corresponding to material on top of the material pile are likely to be brighter in the image data compared with those which are at least partly covered. This is shown figuratively in FIG. 4C, where a brightness pixel value filter has been applied to the image data.

A hole filling process is then performed for the backfilling of "gaps" or "holes" in the processed image data with, for example, pixel values corresponding to an expected pixel value for material components. This may be performed for pixels or pixel groups which are smaller (in size) compared with a threshold size along with the location of the pixel or pixel group with other pixels within the image or pixel sets identified as a material component, e.g. based on their pixel hue value, brightness, etc. This advantageously smooths the processed image data and accounts for noise in the raw image data. The resultant data set is shown figuratively in FIG. 4D. This step may additionally include further smoothing or noise correction, such as the application of an erosion or dilution process to the processed image data.

A final pre-processing step involves the application of a skeletonization process, shown figuratively in FIG. 4E, for representing the image data in a consistent manner across multiple datasets for determination of a material measure in the form a length measure as discussed hereinbelow.

Figure 4E:
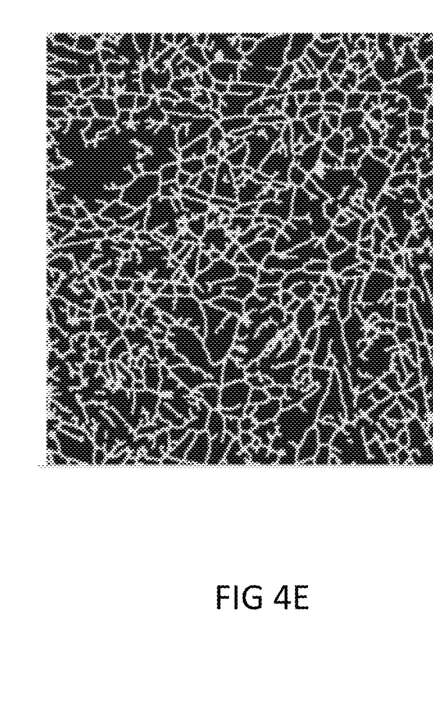

Utilizing the processed data as illustrated in FIG. 4E, the processor 104 is configured to identify the one or more material components through identification of one or more lines, e.g. substantially straight lines, in the skeletonized processed image data. This may correspond to a pixel sequence across a portion of the image data in a given direction, for example. A threshold number of pixels required in a pixel sequence to positively identify a material component may be predefined and utilized here.

In the illustrated embodiments, the processed image data is analyzed across multiple image orientations to further narrow the data set for computation of the quality measure. This is illustrated figuratively in FIG. 5. Specifically, for each of one or more image orientations, an average length, e.g. pixelwise, of identified crop material components and/or a count of identified material components is calculated. A selection is made for a primary orientation for which first quality measure is determined. This selection is based either on the orientation having the largest average length for identified material components, or for the orientation having the largest number of identified components.

In the illustrated examples, four different orientations have been shown, however it will be appreciated that this process may be repeated across multiple image orientations, as required and possible given the processing capabilities of processor 104. To account for small bends in the material components or arcuate material components, each orientation analyzed may comprise a range of orientations, e.g. plus or minus a set number of degrees from a selected orientation to account for relatively small bends in identified components or curved or arcuate material components.

The material quality measure is then calculated as an average length of material components lying in the primary orientation, and is used to control the operable components in the manner discussed hereinabove. This may include comparison of the determined measure with a desired or target cut length, for example, which is utilized to inform the operator or at least partly automate an adjustment in the processor settings of the harvester 10, e.g. to obtain a change in the cut length or other processing parameters for the material.

General

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device, or integrated circuits or on an optically or magnetically readable medium such as, for example, a CD, DVD, magnetic disk, or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

All references cited herein are incorporated herein in their entireties. If there is a conflict between definitions herein and in an incorporated reference, the definition herein shall control.

What is claimed is:

1. A system for monitoring operation of an agricultural harvesting machine, the system comprising:
    an imaging device configured for capturing image data; and
    one or more controllers, configured to:
        receive the image data from the imaging device;
        analyze the image data, in each of a plurality of image orientations, to identify one or more material components within the image data;
        determine, in each image orientation and for at least one of the one or more identified material components, one or more material characteristics;
        select a primary image orientation from the plurality of image orientations in dependence on the determined material characteristic(s);
        determine, in dependence on the material characteristic(s) for one or more of the identified material component(s) in the primary image orientation, a material quality measure indicative of a length of identified material component(s) in the primary image orientation; and
        generate and output one or more control signals for controlling operation of one or more operable components of or otherwise associated with the harvesting machine in dependence on the material quality measure.

2. A system of claim 1, wherein the one or more controllers are configured to determine an average length of identified crop material components at the one or more image orientations.

3. A system of claim 1, wherein the one or more controllers are configured to determine a count of identified material components at each orientation.

4. A system of claim 3, wherein the one or more controllers are configured to determine, for each orientation, a count of the number of identified material components having a length which exceeds a threshold length.

5. A system of claim 1, wherein the one or more image orientations comprise discrete directions or orientations within the image data or are computed over a series of orientation ranges.

6. A system of claim 1, wherein the one or more controllers are configured to select the primary orientation in dependence on the image orientation at which the highest average length for identified material component(s) is determined.

7. A system of claim 1, wherein the one or more controllers are configured to select the primary orientation may be selected in dependence on the image orientation at which the largest number of material components are identified.

8. A system of claim 1, wherein the imaging device comprises a camera which is mounted or otherwise coupled to the agricultural harvesting machine or is provided by a user device.

9. A system of claim 1 wherein the one or more controllers are provided as one or more processors of a user device.

10. A system of claim 1, wherein the one or more controllers are configured for identifying the one or more components through performance of one or more pre-processing steps on raw image data received from the imaging sensor.

11. A system of claim 10, wherein the one or more pre-processing steps include one or more of:
    an edge detection method for identifying the one or more material components within the image data;
    a filtering process; optionally wherein the one or more controllers are configured to apply a filter utilizing one or more image properties;
    a hole filling process;
    a smoothing process or noise correction; and
    a skeletonization process.

12. A system of claim 1, wherein the one or more operable components of or otherwise associated with the harvesting machine include a user interface for providing a representation of the determined material quality measure; optionally wherein the user interface comprises a display screen of a user device.

13. A system of claim 1, wherein the one or more operable components comprises a database; and wherein the one or more controllers are configured to add data to, or update data stored within the databased in dependence on the determined material quality measure for the generation and/or updating a mapped representation of a working environment for the machine, mapping material quality across the environment.

14. A system of claim 1, wherein the one or more operable components include a control system for the harvesting machine itself, one or more components thereof, or a working implement operably coupled thereto.

15. An agricultural harvesting machine comprising or controllable under operation of the system of claim 1.

16. A method for monitoring operation of an agricultural harvesting machine, the method comprising:
    receiving image data from an imaging device;
    analyzing the image data, in each of a plurality of image orientations, to identify one or more material components within the image data;

determining, in each image orientation and for at least one of the one or more identified material components, one or more material characteristics;

selecting a primary image orientation from the plurality of image orientations in dependence on the determined material characteristic(s);

determining, in dependence on the material characteristic(s) for one or more of the identified material component(s) in the primary image orientation, a material quality measure indicative of a length of identified material component(s) in the primary image orientation; and controlling operation of one or more operable components of or otherwise associated with the harvesting machine in dependence on the material quality measure.

* * * * *